(12) United States Patent
Luo et al.

(10) Patent No.: US 12,581,409 B2
(45) Date of Patent: Mar. 17, 2026

(54) POWER SAVING TECHNIQUES FOR SUPPORTING DOWNLINK DATA BUFFER SIZE NEGOTIATION IN A TARGET WAKE TIME (TWT) PROTOCOL

(71) Applicant: Cypress Semiconductor Corporation, San Jose, CA (US)

(72) Inventors: Hui Luo, Marlboro, NJ (US); Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 338 days.

(21) Appl. No.: 18/488,769

(22) Filed: Oct. 17, 2023

(65) Prior Publication Data

US 2025/0126555 A1     Apr. 17, 2025

(51) Int. Cl.
*H04W 28/02*     (2009.01)
*H04W 52/02*     (2009.01)

(52) U.S. Cl.
CPC ................................ *H04W 52/0216* (2013.01)

(58) Field of Classification Search
CPC ......... H04W 52/0216; H04W 52/0206; H04W 72/1263; H04W 72/0446; H04W 52/0235; H04W 72/1284
See application file for complete search history.

(56) References Cited

U.S. PATENT DOCUMENTS

2023/0337136 A1 * 10/2023 Abotabl ............ H04W 52/0235
2023/0397101 A1 * 12/2023 Abotabl ............ H04W 72/0446

* cited by examiner

*Primary Examiner* — Phuoc H Doan

(57) ABSTRACT

Systems and methods described herein determine, by a processing device executing on a requesting station, a target wake time (TWT) buffer size, wherein the TWT buffer size indicates a buffer size to allocate at a responding station when the requesting station is in a sleep mode. The systems and methods insert, by the requesting station, a TWT buffer size request into a request message, wherein the TWT buffer size request comprises the TWT buffer size. In turn, the systems and methods transmit the request message from the requesting station to the responding station.

20 Claims, 9 Drawing Sheets

800 ➔

Determining, by a processing device executing on a requesting station, a target wake time (TWT) buffer size, wherein the TWT buffer size indicates a buffer size to allocate at a responding station when the requesting station is in a sleep mode
810

Inserting, by the requesting station, a TWT buffer size request into a request message, wherein the TWT buffer size request comprises the TWT buffer size
820

Transmitting the request message from the requesting station to the responding station
830

100
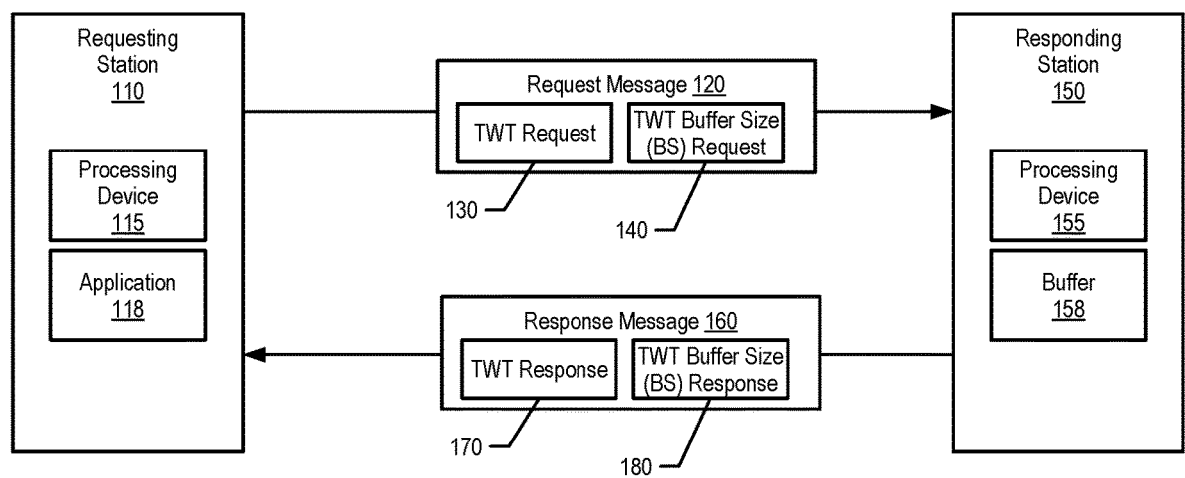
FIG. 1

Request Message 120a

| 200 | | 210 | | 220 | | |
|---|---|---|---|---|---|---|
| Frame Header | ... | TWT Element | ... | Vendor Specific Element | ... | Frame End |
| Association Request | ... | TWT Request | ... | TWT Buffer Size (BS) Request | ... | |

130 ⟋                              ⟍ 140

Request Message 120b

| | | 230 | | | |
|---|---|---|---|---|---|
| Frame Header | ... | TWT Element | ... | Vendor Specific Element | Frame End |
| Association Request | ... | TWT Request, TWT Buffer Size (BS) Request | ... | ... | |

130 ⟋                    ⟍ 140

Response Message 160a

Response Message 160b

400

210

220

410    420    430    440

450

230

460    470    480    490

500

| Requesting Station |
| --- |

↓

| Determine TWT buffer size and requested target wake time<br>510 |
| --- |

↓

| Insert TWT buffer size and requested target wake time into request message<br>520 |
| --- |

↓

| Send request message to responding station<br>530 |
| --- |

| Responding Station |
| --- |

↓

| Receive request message<br>540 |
| --- |

↓

| Detect TWT buffer size in request message and construct TWT buffer size response<br>550 |
| --- |

↓

| Insert TWT buffer size response into response message<br>555 |
| --- |

↓

| Send response message to requesting station<br>560 |
| --- |

‹- - - -

| Receive response message<br>570 |
| --- |

↓

| Detect TWT Buffer size response in response message and negotiate acceptable TWT buffer size with responding station<br>580 |
| --- |

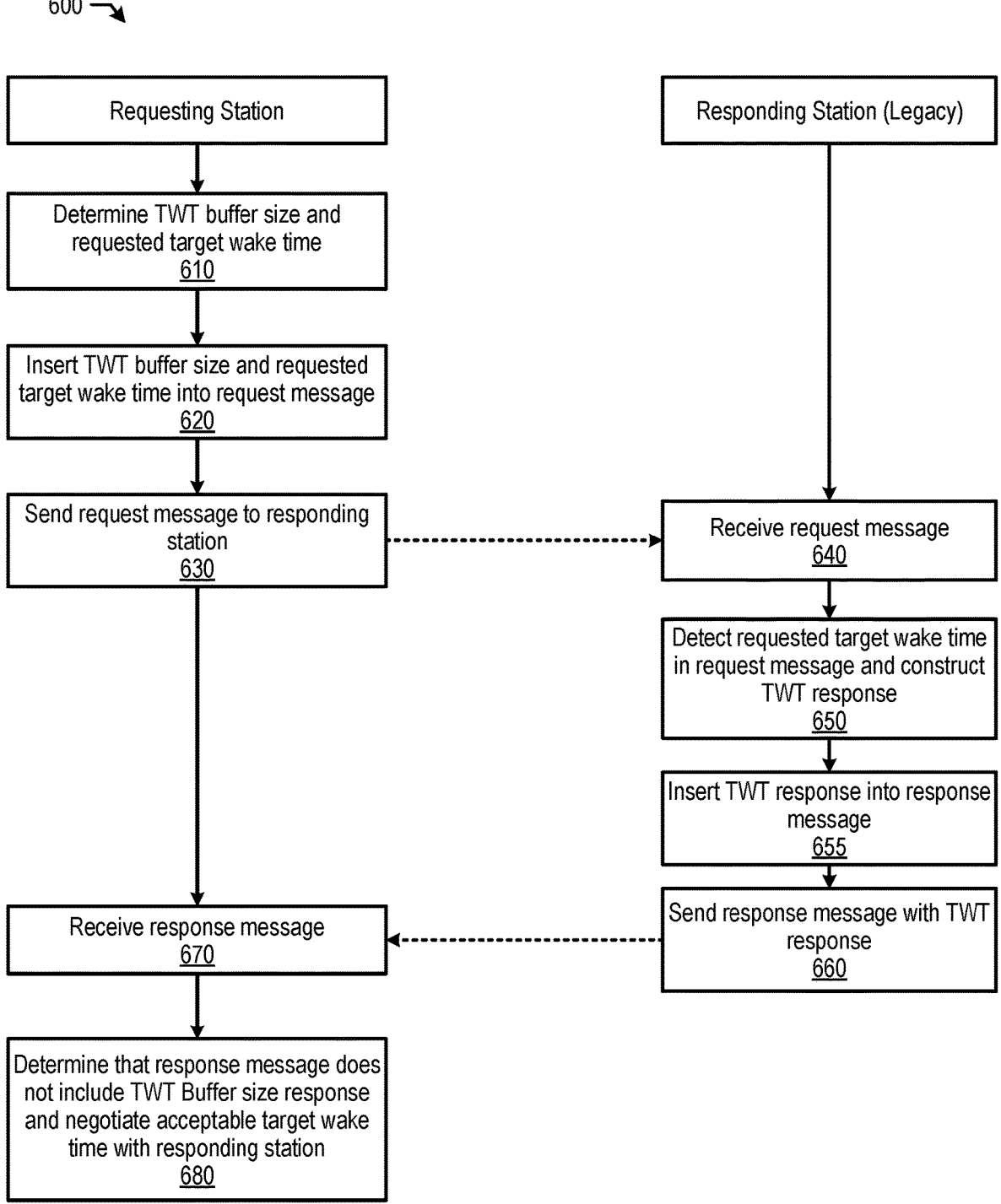

Requesting Station

Determine TWT buffer size and requested target wake time
610

Insert TWT buffer size and requested target wake time into request message
620

Send request message to responding station
630

Responding Station (Legacy)

Receive request message
640

Detect requested target wake time in request message and construct TWT response
650

Insert TWT response into response message
655

Send response message with TWT response
660

Receive response message
670

Determine that response message does not include TWT Buffer size response and negotiate acceptable target wake time with responding station
680

FIG. 6

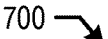

700

| Requesting Station (Legacy) | | Responding Station |
|---|---|---|

Determine requested target wake time
710

Insert requested target wake time into request message
720

Send request message to responding station
730

Receive request message
740

Determine that request message does not include TWT BS request and construct TWT response based on requested target wake time
750

Insert TWT response into response message
755

Receive response message
770

Send response message with TWT response
760

Negotiate acceptable target wake time with responding station
780

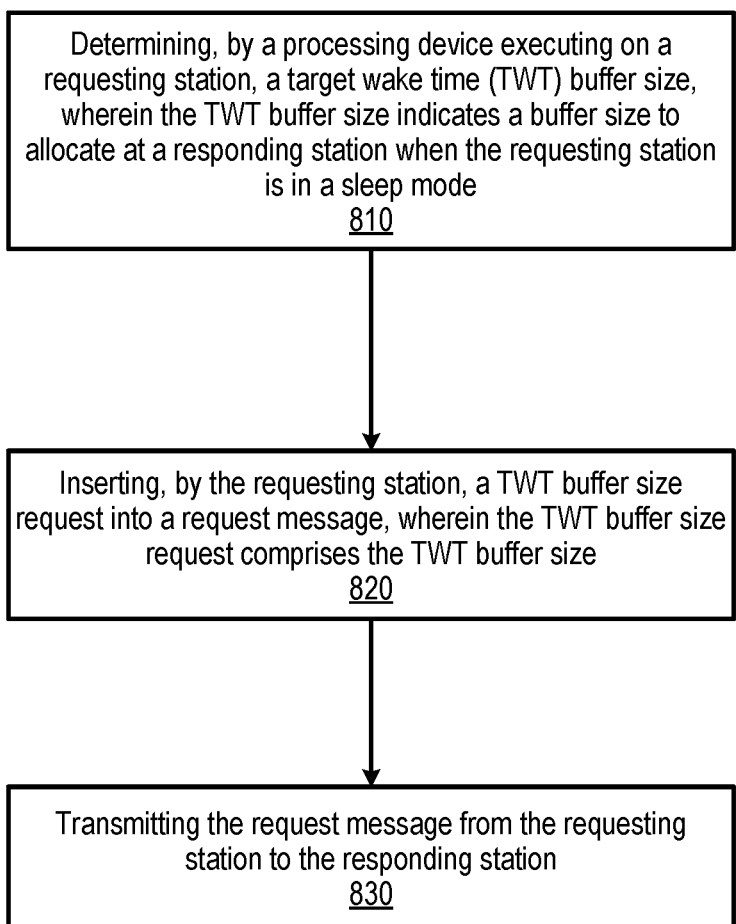

Determining, by a processing device executing on a requesting station, a target wake time (TWT) buffer size, wherein the TWT buffer size indicates a buffer size to allocate at a responding station when the requesting station is in a sleep mode
810

Inserting, by the requesting station, a TWT buffer size request into a request message, wherein the TWT buffer size request comprises the TWT buffer size
820

Transmitting the request message from the requesting station to the responding station
830

FIG. 8

POWER SAVING TECHNIQUES FOR SUPPORTING DOWNLINK DATA BUFFER SIZE NEGOTIATION IN A TARGET WAKE TIME (TWT) PROTOCOL

TECHNICAL FIELD

Aspects of the present disclosure generally relate to wireless technology, and in particular, to power saving techniques for supporting downlink data buffer size negotiation in a target wake time (TWT) protocol.

BACKGROUND

A Wi-Fi (Wireless Fidelity) network is a wireless network that enables wireless communication between devices such as computers, smartphones, tablets, and Internet of Things (IoT) devices. Target Wake Time (TWT) is a power-saving mode to optimize power management in Wi-Fi devices by allowing devices to sleep for extended periods. IoT devices use TWT to improve power efficiency by negotiating scheduled wake times for the IoT devices to wake up and receive or transmit data.

A "station" refers to a device that is equipped with a wireless network interface controller and uses a Wi-Fi protocol to connect to other devices or networks. An Access Point (AP) is a specialized type of station that serves as a central transmitter and receiver of wireless radio signals. A station that has access point capability is typically referred to as an AP, a wireless access point (WAP), or a simply a station (STA). A station that does not have access point capability is typically referred to as an IoT device or non-AP station (non-AP STA). Non-AP stations are typically end devices (e.g., IoT gadgets) that communicate with a station (e.g., AP) to gain network connectivity.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 is a block diagram that illustrates an example system for power saving techniques for supporting downlink data buffer size negotiation in a TWT protocol, in accordance with some embodiments of the present disclosure.

FIG. 5 is a flow diagram of a method for negotiating a TWT buffer size between a requesting station and a responding station, in accordance with some embodiments of the present disclosure.

FIG. 6 is a flow diagram of a method for a requesting station sending a TWT buffer size request and receiving a TWT response from a legacy responding station, in accordance with some embodiments of the present disclosure.

FIG. 7 is a flow diagram of a method for a legacy requesting station sending a TWT request and a responding station processing the TWT request, in accordance with some embodiments of the present disclosure.

FIG. 8 is a flow diagram of a method for a requesting station to determine a TWT buffer size and transmit a request message that includes the TWT buffer size to a responding station.

DETAILED DESCRIPTION

Figures 2A, 2B:
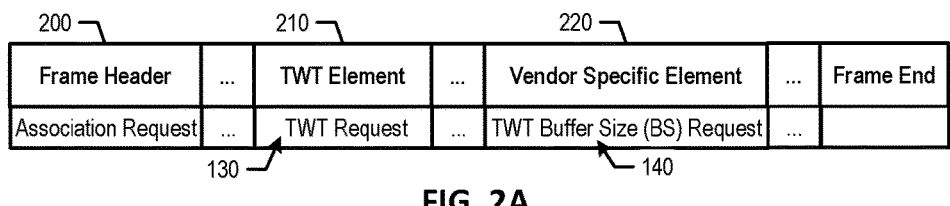
FIG. 2A is a diagram that illustrates an example request message with a TWT buffer size request inserted in a vendor specific element, in accordance with some embodiments of the present disclosure.
FIG. 2B is a diagram that illustrates an example request message with TWT buffer size request information included in a TWT element, in accordance with some embodiments of the present disclosure.

As discussed above, wireless devices include power saving mechanisms such as TWT to optimize their energy consumption, such as battery powered wireless devices. TWT enables devices to improve power efficiency by negotiating scheduled wake times for the IoT devices to wake up and receive or transmit data. A station and non-AP station may be considered a "requesting station" or a "responding station" depending upon a task at hand. For example, when an IoT device sends a TWT request to an access point, the IoT device is considered the requesting station and the access point is considered the responding station.

A challenge found with negotiating wake up times is that a responding station (e.g., access point) is unable to determine how much buffer size to allocate for download data targeted to a requesting station (e.g., IoT device) while the requesting station would be in sleep mode. Although the TWT protocol supports sleep time negotiation, the TWT protocol lacks buffer size negotiation. As such, the responding station either wastes memory by over allocating a buffer size for the requesting station, or drops data due to insufficient buffer size allocation targeted for the requesting station. In addition, a challenge found with existing TWT approaches that the responding station often rejects a requested sleep interval that is too long due to concerns of insufficient buffer space. As a result, the sleep times that the responding station supports is typically much less than the responding station's capabilities.

The present disclosure addresses the above-noted and other deficiencies by providing an approach of determining, by a processing device executing on a requesting station, a target wake time (TWT) buffer size. The TWT buffer size indicates a buffer size for a responding station to allocate while the requesting station is in a sleep mode. The requesting station then inserts a TWT buffer size request, which includes the TWT buffer size, into a request message. In turn, the requesting station transmits the request message to the responding station.

In some embodiments, the requesting station inserts the TWT buffer size request into a vendor specific element in the request message. In some embodiments, the requesting station inserts the TWT buffer size request into a TWT element in the request message when supported, for example, by a wireless standard. In some embodiments, the requesting station inserts a TWT request into the TWT element that includes a requested target wake time corresponding to an end of the sleep mode.

In some embodiments, the TWT buffer size corresponds to an estimated amount of downlink data to be received at the responding station over a computer network while the requesting station is in the sleep mode. In some embodiments, the estimated amount of downlink data corresponds to an application executing on the requesting station.

In some embodiments, the requesting station receives a response message from the responding station. The requesting station determines whether the response message includes a TWT buffer size response corresponding to the TWT buffer size request. When response message includes the TWT buffer size response, the requesting station negotiates with the responding station an acceptable TWT buffer size for the responding station to allocate. When the response message does not include the TWT buffer size response, the requesting station negotiates with the responding station an acceptable target wake time based on the requested target wake time from the requesting station.

In some embodiments, when the responding station receives a request message from the requesting station, the responding station determines whether the request message includes the TWT buffer size request. In response to determining that the request message includes the TWT buffer size request, the responding station constructs a TWT buffer size response based on the TWT buffer size request, and transmits the response message that includes the TWT buffer size response to the requesting station. In some embodiments, the responding station allocates a buffer size to the requesting station in a storage area based on the TWT buffer size request. The responding station then stores downloaded content targeted to the requesting station while the requesting station is in sleep mode.

In some embodiments, when the request message does not include the TWT buffer size request, the responding station constructs a TWT response based on a requested target wake time included in the request message and transmits the response message with the TWT response to the requesting station.

As discussed herein, the present disclosure provides an approach that improves the operation of a computer system by enabling a requesting device to provide a buffer size request to a responding station so that the responding station can effectively manage its memory. In addition, the present disclosure provides an improvement to the technological field of wireless technology by enabling a requesting station and an responding station the ability to negotiate increased buffer size allocation, which results in longer sleep times and reduced battery consumption for the requesting station.

FIG. 1 is a block diagram that illustrates an example system for power saving techniques for supporting downlink data buffer size negotiation in a TWT protocol, in accordance with some embodiments of the present disclosure.

System 100 includes requesting station 110 and responding station 150. Requesting station may be, for example, an IoT device (e.g., a non-AP station) and responding station 150 may be, for example, an access point.

Requesting station 110 includes processing device 115 and application 118. In some embodiments, processing device 115 estimates an amount of download data that application 118 may receive from responding station 150 during a particular time interval. For example, processing device 115 may determine, based on prior downloads or from information received from application 118, that application 118 may receive 100 bytes of download data every hour. As such, processing device 115 may determine a maximum wake up time and corresponding buffer size for responding station 150 to store download data targeted for requesting station 110 while requesting station 110 will be in sleep mode. In some embodiments, the determination is based on a protocol standard or buffer size limitation at responding station 150.

Requesting station 110 then configures request message 120 with TWT request 130 and TWT buffer size request 140. TWT request 130 includes a requested wake up time, and TWT buffer size request includes a requested buffer size. In some embodiments, TWT buffer size request 140 is included in a vendor specific element (see FIG. 2A and corresponding text for further details). In some embodiments, TWT buffer size request 140 is included in a TWT element, for example, when supported by a protocol standard (see FIG. 2B and corresponding text for further details).

In some embodiments, requesting station 110 includes control information in request message 120. The control information establishes a TWT session and may include a request command, a suggest command, a demand command, or a grouping command. A request command indicates that requesting station 110 would like to have the ability to request specific wake times. A suggest command indicates that requesting station 110 is including suggested TWT parameters in request message 120 (e.g., suggested wake time and buffer size). These values would then be considered by responding station 150 in its TWT scheduling. A demand command indicates that requesting station 110 demands a specific wake time/buffer size allocation. A grouping command indicates that two or more requesting stations have the same TWT, enabling them to wake up and communicate with responding station 150 at the same time.

Responding station 150 includes processing device 155 and buffer 158. Processing device 155 performs operations by responding station 150 as discussed herein, and responding station 150 uses buffer 158 to store download data targeted for requesting station 110 while requesting station is in sleep mode. Responding station 150 receives request message 120 and detects TWT buffer size request 140. Responding station 150 determines whether it can support the requested buffer size in TWT buffer size request 140, and constructs response message 160 accordingly. Response message 160 includes TWT response 170 and TWT buffer size response 180. TWT response 170 is included in a TWT element. In some embodiments, TWT buffer size response 180 is included in a vendor specific element (see FIG. 3A and corresponding text for further details). In some embodiments, TWT buffer size response 180 is included in a TWT element, for example, when supported by a protocol standard (see FIG. 3B and corresponding text for further details).

In some embodiments, response message 160 includes commands such as Grouping, Accept, Alternative, Dictate, or a combination thereof. A Grouping command indicates whether responding station 150 supports group TWT. An Accept command indicates whether responding station 150 accepts the suggested parameters for TWT (wake up time and requested buffer size) as set by requesting station 110. An Alternative command informs requesting station 110 that responding station 160 has an alternative suggestion for the TWT parameters (wake up time, requested buffer size, or a combination thereof). A dictate command indicates that responding station 150 is dictating the terms of the TWT agreement (wake up time, requested buffer size, or a combination thereof), typically due to its knowledge of network conditions and the requirement to manage power consumption and network congestion. A Reject command indicates that responding station 150 rejects the TWT request, likely due to requesting station 110's proposed TWT parameters not fitting in with the network requirements (wake up time, requested buffer size, or a combination thereof). When both requesting station 110 and responding station 150 reach an agreement, they proceed to the next operation, such as a 4-way handshake protocol.

In some embodiments, if responding station 150 is not able to support the requested TWT buffer size, responding station 150 may respond and "suggest" or "dictate" an alternative TWT buffer size (e.g., a smaller buffer size), and a proportionally reduced TWT sleep time. If requesting station 110 can accept these alternatives, requesting station 110 proceeds to run 4-way handshake protocol to signal both requesting station 110 and responding station 150 reach the agreement. In some embodiments, if requesting station 110 cannot accept the alternatives proposed by responding station 150, requesting station 110 may not proceed to the 4-way handshake protocol. In some embodiments, if these alternatives are "dictated" by responding station 150, the association protocol may fail if requesting station 110 cannot accept the alternatives. If these alternatives are "suggested" by responding station 150, requesting station 110 may re-send a second request message 120 with a smaller TWT buffer size and a corresponding TWT sleep time. In some embodiments, if the new, smaller parameters are the minimum to be satisfied, requesting station 110 may use a "demand" command in the second request message 120. If the new, smaller parameters are not the minimum to be satisfied, requesting station 110 may use a "request" command in the second request message 120. In some embodiments, if responding station 150 is not able to support the new set of parameters in the second request and the second request includes a "demand" command, responding station 150 may send a "reject" command in response message 160 to requesting station 110. If the second request message includes a "request" command and responding station is not able to support the new set of parameters, responding station 150 may respond with a message to "suggest" or "dictate" an alternative TWT buffer size (logically a smaller one), and a proportionally reduced TWT sleep time in the response message 160.

FIG. 2A is a diagram that illustrates an example request message with a TWT buffer size request inserted in a vendor specific element, in accordance with some embodiments of the present disclosure.

Request message 120a includes frame header 200, TWT element 210, and vendor specific element 220. When requesting station 110 prepares to send a TWT buffer size request to responding station 150, requesting station 110 includes a TWT setup command in frame header 200, such as "Association Request" or "Reassociation Request." An association request refers to an initial step where requesting station 110 seeks to connect to responding station 150. A reassociation request occurs when requesting station 110 is already connected to a network and decides to switch and establish a connection to a different responding station within the same network, such as to due to improved signal strength or reduced interference.

Requesting station 110 includes TWT request 130 in TWT element 210. TWT request 130 includes a requested target wake time which signifies a time at which requesting station 110 requests to wake from a power-saving mode to send or receive data. For example, if requesting station 110 runs an application 118 that requires frequent data exchange, requesting station 110 may request a sooner target wake time (e.g., shorter sleep duration). In another example, if requesting station 110 runs an application 118 that synchronizes data a few times a day, requesting station 110 may request a later target wake time (e.g., longer sleep duration) to conserve battery power. TWT element 210 may include a TWT control field and a TWT field. The TWT control field may include a request command, a suggest command, a demand command, or a grouping command as discussed above, and the TWT field may include the target wake time (see FIG. 4A and corresponding text for further details).

Requesting station 110 includes TWT buffer size request 140 in vendor specific element 220. Vendor specific element 220 is an element available to, for example, a manufacturer for sending information. TWT buffer size request 140 may include a subtype field (e.g., TWT buffer size control field) and a buffer size field. The subtype field main include a request command, a suggest command, a demand command, or a grouping command corresponding to the buffer size request, and the buffer size field may include the requested buffer size (see FIG. 4A and corresponding text for further details). In some embodiments that are supported by a wireless protocol, the TWT buffer size request information is included in TWT element 210 (see FIG. 2B and corresponding text for further details).

FIG. 2B is a diagram that illustrates an example request message with TWT buffer size request information included in a TWT element, in accordance with some embodiments of the present disclosure. Request message 120b shows that TWT request 130 and TWT buffer size request 140 are included in TWT element 230. In some embodiments, TWT element 230 includes a TWT control field, a TWT field, a TWT BS control field and a buffer size field, which includes the target wake time and TWT buffer size information as discussed above. In some embodiments, TWT element 230 may include more or less fields than what is shown in FIG. 2B. In some embodiments, request message 120b includes a new element that includes target wake time and TWT buffer size information based on, for example, a wireless protocol standard.

Figure 3A:
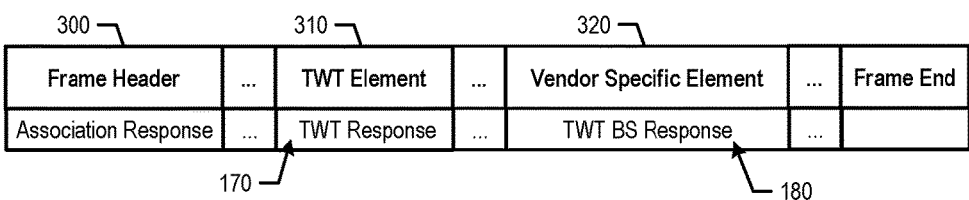
FIG. 3A is a diagram that illustrates an example response message with a TWT buffer size response inserted in a vendor specific element, in accordance with some embodiments of the present disclosure.

FIG. 3A is a diagram that illustrates an example response message with a TWT buffer size response inserted in a vendor specific element, in accordance with some embodiments of the present disclosure.

Response message 160a includes frame header 300, TWT element 310, and vendor specific element 320. When responding station 150 prepares to send a TWT buffer size response to requesting station 110, responding station 150 includes a TWT command in frame header 200, such as "Association Response" or "Reassociation Response."

Responding station 150 includes TWT response 170 in TWT element 310 and includes TWT BS response 180 in vendor specific element 320. In some embodiments, as discussed above, responding station 150 includes commands such as Grouping, Accept, Alternative, Dictate, or a combination thereof in response message. Responding station 150 may include these commands in TWT response, TWT BS response, or a combination thereof. Responding station 150 may also include an alternative target wake time, an alternative TWT buffer size, or a combination thereof in TWT response 170 and TWT BS response 180, respectively.

Figure 3B:
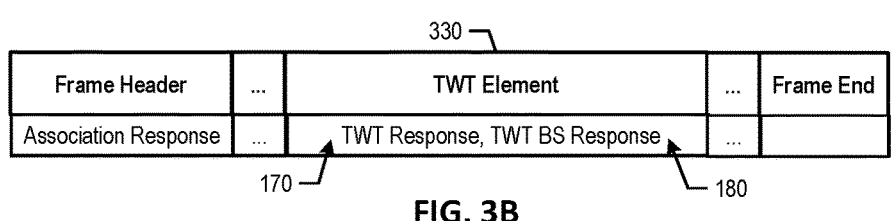
FIG. 3B is a diagram that illustrates an example response message with a TWT buffer size response inserted in a TWT element, in accordance with some embodiments of the present disclosure.

FIG. 3B is a diagram that illustrates an example response message with a TWT buffer size response inserted in a TWT element, in accordance with some embodiments of the present disclosure. Response message 160*b* shows that TWT response 170 and TWT BS response 180 are included in TWT element 330. In some embodiments, TWT element 330 includes a TWT control field, a TWT field, a TWT BS control field and a buffer size field, which includes a response to the requested target wake time, the TWT buffer size request, or a combination thereof as discussed herein. In some embodiments, TWT element 330 may include more or less fields than what is shown in FIG. 3B. In some embodiments, response message 620*b* includes a new element that includes the target wake time and TWT buffer size information based on, for example, a wireless protocol standard.

Figure 4A:
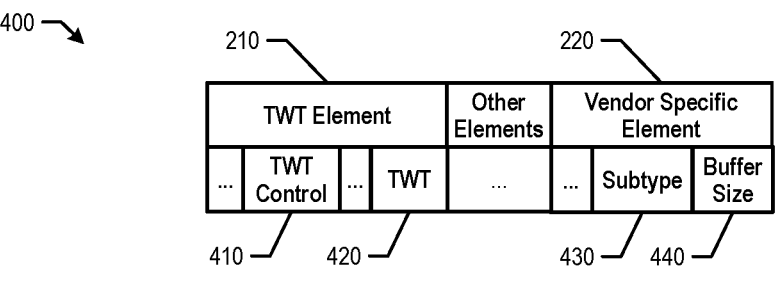
FIG. 4A is a diagram that illustrates an example of fields in a separate TWT element and vendor specific element, in accordance with some embodiments of the present disclosure.

FIG. 4A is a diagram that illustrates an example of fields in a separate TWT element and vendor specific element, in accordance with some embodiments of the present disclosure. Diagram 400 shows TWT element 210 and vendor specific element 220. TWT element 210 includes TWT control field 410 and TWT field 420. In a request message, TWT control field 410 may include a command such as request, suggest, demand, grouping, or a combination thereof, and TWT field 420 includes a requested target wake time. In a response message, TWT control field 410 may include a command such as grouping, accept, alternative, dictate, or a combination thereof, and TWT field 420 may include an alternative target wake time.

Vendor specific element 220 includes subtype field 430 (e.g., TWT BS control field) and buffer size field 440. In a request message, subtype field 430 may include a command such as request, suggest, demand, grouping, or a combination thereof, and buffer size field 440 includes a requested buffer size. In a response message, subtype field 430 may include a command such as grouping, accept, alternative, dictate, or a combination thereof, and buffer size field 440 may include an alternative buffer size.

Figure 4B:
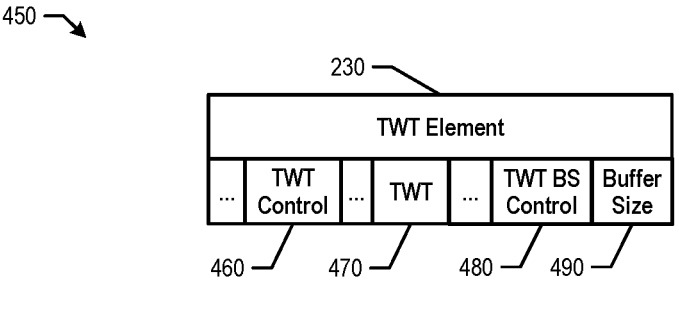
FIG. 4B is a diagram that illustrates an example of fields in a TWT element, in accordance with some embodiments of the present disclosure.

FIG. 4B is a diagram that illustrates an example of fields in a TWT element, in accordance with some embodiments of the present disclosure. Diagram 450 shows an embodiment where TWT element 230 includes TWT control field 460, TWT field 470, TWT BS control field 480 (e.g., subtype field 430), and buffer size field 490, such as when requesting station 110 and responding station 150 utilize a wireless protocol that supports including TWT BS control field 480 and buffer size field 490 in TWT element 230. The information included in fields 460, 470, 480, and 490 may be similar to the information in fields 410, 420, 430, and 440 discussed above.

FIG. 5 is a flow diagram of a method for negotiating a TWT buffer size between a requesting station and a responding station, in accordance with some embodiments of the present disclosure. Method 500 shows an embodiment where both a requesting station and a responding station are configured to process TWT buffer size requests and responses.

Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 115, processing device 155, processing device 902 shown in FIG. 9, or a combination thereof.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIG. 5, method 500 begins at block 510, where requesting station processing logic determines a TWT buffer size and a requested target wake time. At block 520, requesting station processing logic inserts the TWT buffer size and the requested target wake time into a request message. As discussed herein, requesting station processing logic may insert the TWT buffer size into a vendor specific element, or into a TWT element based on the protocol utilized by requesting station 110 and responding station 150. At block 530, requesting station processing logic sends the request message (e.g., request message 120) to the responding station.

At block 540, responding station processing logic receives the request message. At block 550, responding station processing logic detects the TWT buffer size in the request message and constructs a TWT buffer size response. At block 560, responding station processing logic sends the response message with the TWT buffer size response to the requesting station. In some embodiments, as discussed above, if responding station 150 is not able to support the requested TWT buffer size, responding station 150 may respond and "suggest" or "dictate" an alternative TWT buffer size (e.g., a smaller buffer size), and a proportionally reduced TWT sleep time.

At block 570, requesting station processing logic receives the response message from responding station. At block 580, requesting station processing logic detects the TWT buffer size response in the response message and negotiates an acceptable TWT buffer size with the responding station. In some embodiments, as discussed above, if responding station 150 includes an alternative TWT buffer size or TWT in the response, responding station 150 evaluates the alternatives. If requesting station 110 can accept these alternatives, requesting station 110 proceeds to run 4-way handshake protocol to signal both requesting station 110 and responding station 150 reach the agreement. However, if requesting station 110 cannot accept the alternatives proposed by responding station 150, requesting station 110 may not proceed to the 4-way handshake protocol. In some embodiments, if these alternatives are "dictated" by responding station 150, the association protocol may fail if requesting station 110 cannot accept the alternatives. If these alternatives are "suggested" by responding station 150, requesting station 110 may re-send a second request message 120 with a smaller TWT buffer size and a corresponding TWT sleep time.

FIG. 6 is a flow diagram of a method for a requesting station sending a TWT buffer size request and receiving a TWT response from a legacy responding station, in accordance with some embodiments of the present disclosure. Method 600 shows an embodiment where the requesting station is enabled to process TWT buffer size requests and responses but the responding station is not enabled to process TWT buffer size requests and responses.

Method 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by processing device 115, processing device 165, processing device 902 shown in FIG. 9, or a combination thereof.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

With reference to FIG. 6, method 600 begins at block 610, where requesting station processing logic determines a TWT buffer size and a requested target wake time. At block 620, requesting station processing logic inserts the TWT buffer size and the requested target wake time into a request message. As discussed herein, requesting station processing logic may insert the TWT buffer size into a vendor specific element, or into TWT element based on the protocol. At block 630, requesting station processing logic sends the request message to the responding station.

At block 640, responding station processing logic receives the request message. At block 650, because the requesting station is not configured to process a TWT buffer size request, responding station processing logic reverts to detecting the requested target wake time in the requested message and constructs a TWT response based on the requested target wake time. At block 655, responding station processing logic inserts the TWT response into a response message. At block 660, responding station processing logic sends the response message with the TWT response to the requesting station.

At block 670, requesting station processing logic receives the response message from the responding station. At block 680, requesting station processing logic determines that the response message does not include a TWT buffer size response. As such, requesting station processing logic determines that the responding station is not configured to process TWT buffer size requests and responses. Therefore, requesting station processing logic negotiates an acceptable target wake time with the responding station accordingly.

FIG. 7 is a flow diagram of a method for a legacy requesting station sending a TWT request and a responding station processing the TWT request, in accordance with some embodiments of the present disclosure. Method 600 shows an embodiment where the requesting station is not enabled to process TWT buffer size requests and responses but the responding station is enabled to process TWT buffer size requests and responses.

Method 700 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by processing device 115, processing device 175, processing device 902 shown in FIG. 9, or a combination thereof.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

With reference to FIG. 7, method 700 begins at block 710, where requesting station processing logic determines a requested target wake time. Requesting station processing logic does not determine a TWT buffer size because the requesting station is not configured to process TWT buffer size requests and responses. At block 720, requesting station processing logic inserts the requested target wake time into a request message. At block 730, requesting station processing logic sends the request message to the responding station.

At block 740, responding station processing logic receives the request message from the requesting station. At block 750, because the responding station is configured to process TWT buffer size requests and responses, responding station processing logic checks for a TWT buffer size request in the request message. Responding station processing logic does not detect the TWT buffer size request in the request message and, in turn, constructs a TWT response based on the requested target wake time in the request message. At block 755, responding station processing logic inserts the TWT response into a response message. At block 760, responding station processing logic sends the response message with the TWT response to the requesting station.

At block 770, requesting station processing logic receives the response message from the responding station. At block 780, requesting station processing logic negotiates an acceptable target wake time with the responding station accordingly.

FIG. 8 is a flow diagram of a method of a requesting station determining a TWT buffer size and transmitting a request message that includes the TWT buffer size to a responding station. Method 800 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by processing device 115, processing device 902 shown in FIG. 9, or a combination thereof.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

With reference to FIG. 8, method 800 begins at block 810, where requesting station processing logic determines a target wake time (TWT) buffer size. The TWT buffer size indicates a buffer size to allocate at a responding station when the requesting station is in a sleep mode. In some embodiments, the TWT buffer size corresponds to an estimated amount of downlink data to be received at the responding station over a computer network while the requesting station is in the sleep mode. In some embodiments, the estimated amount of downlink data corresponds to an application executing on the requesting station.

At block 820, requesting station processing logic inserts a TWT buffer size request, which includes the TWT buffer size, into a request message. In some embodiments, requesting station processing logic inserts the TWT buffer size request into a vendor specific element in the request message. In some embodiments, requesting station processing logic inserts the TWT buffer size request into a TWT element in the request message. In some embodiments, requesting station processing logic inserts the TWT buffer size request into the vendor specific element and inserts a requested target wake time into the TWT element.

At block 830, processing logic transmits the request message from the requesting station to the responding station. In turn, the responding station processes the request message and provides a response to the requesting station as discussed herein.

Figure 9:
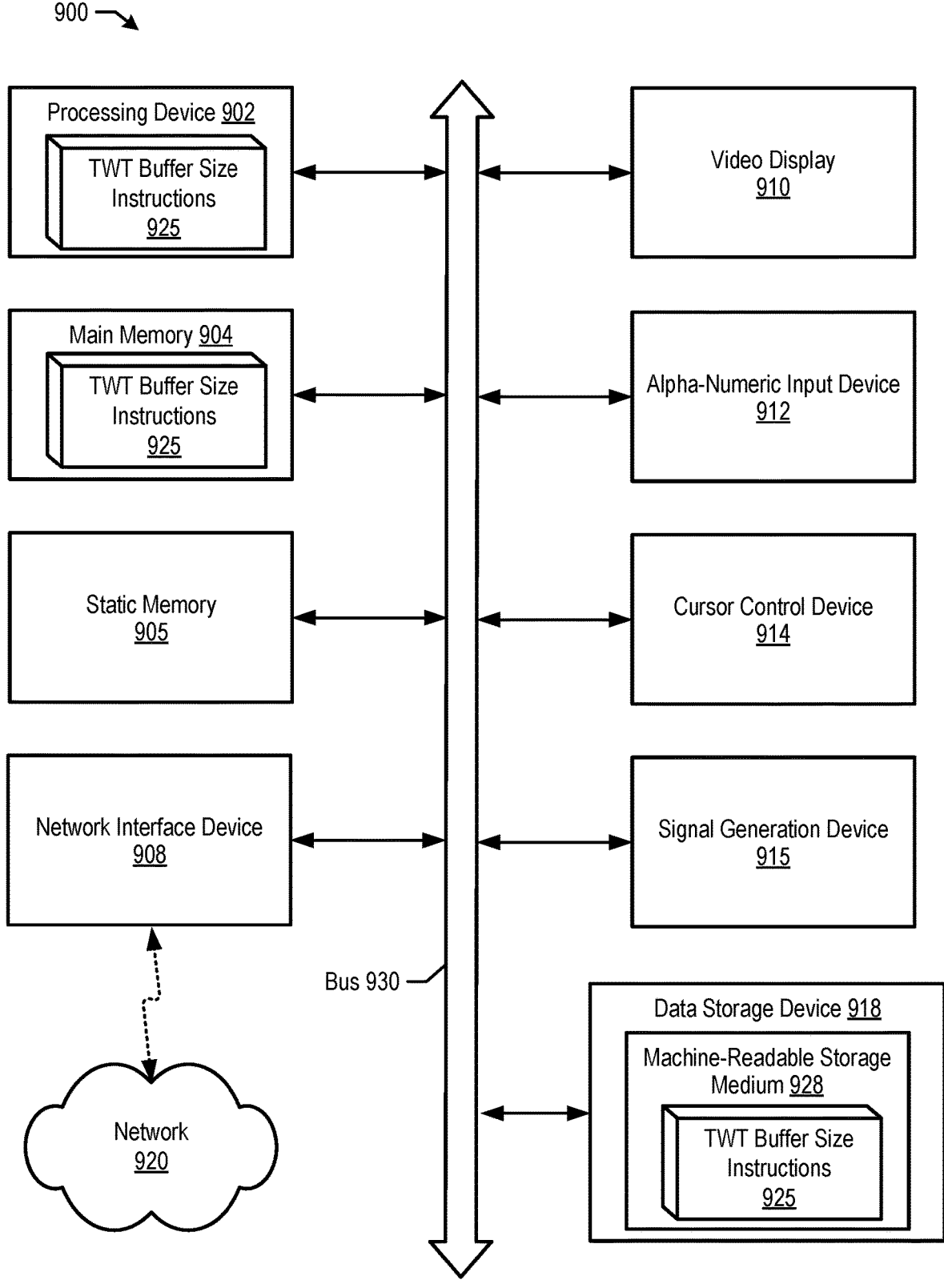
FIG. 9 is a block diagram of an example communication device that may perform one or more of the operations described herein, in accordance with some embodiments of the present disclosure.

FIG. 9 illustrates a diagrammatic representation of a machine in the example form of a computer system 900 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 900 may be representative of a server.

The exemplary computer system 900 includes a processing device 902, a main memory 904 (e.g., read-only memory (ROM), flash memory, dynamic random access memory (DRAM), a static memory 909 (e.g., flash memory, static random access memory (SRAM), etc.), and a data storage device 918 which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing system 900 may further include a network interface device 908 which may communicate with a network 920. The computing system 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 919 (e.g., a speaker). In some embodiments, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute TWT buffer size instructions 925, for performing the operations and steps discussed herein.

The data storage device 918 may include a machine-readable storage medium 928, on which is stored one or more sets of TWT buffer size instructions 925 (e.g., software) embodying any one or more of the methodologies of functions described herein. The TWT buffer size instructions 925 may also reside, completely or at least partially, within the main memory 904 or within the processing device 902 during execution thereof by the computer system 900; the main memory 904 and the processing device 902 also constituting machine-readable storage media. The TWT buffer size instructions 925 may further be transmitted or received over a network 920 via the network interface device 908.

The machine-readable storage medium 928 may also be used to store instructions to perform a method for intelligently scheduling containers, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "determining," "inserting," "transmitting," "receiving," "negotiating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

determining, by a processing device executing on a requesting station, a target wake time (TWT) buffer size, wherein the TWT buffer size indicates a buffer size to allocate at a responding station when the requesting station is in a sleep mode;

inserting, by the requesting station, a TWT buffer size request into a request message, wherein the TWT buffer size request comprises the TWT buffer size; and transmitting the request message from the requesting station to the responding station.

2. The method of claim 1, further comprising:

receiving, at the requesting station, a response message from the responding station;

determining whether the response message comprises a TWT buffer size response;

in response to determining that the response message comprises the TWT buffer size response, negotiating, between the requesting station and the responding station, an acceptable TWT buffer size for the responding station to allocate when the requesting station is in the sleep mode.

3. The method of claim 2, wherein the request message comprises a TWT element, the method further comprising:

inserting a TWT request into the TWT element, wherein the TWT request comprises a requested target wake time corresponding to an end of the sleep mode; and in response to determining that the response message does not comprise the TWT buffer size response, negotiating, between the requesting station and the responding station, an acceptable target wake time, based on the requested target wake time, for the requesting station to end the sleep mode.

4. The method of claim 2, wherein the response message comprises a vendor specific element, and wherein the vendor specific element comprises the TWT buffer size response.

5. The method of claim 1, wherein the request message comprises a TWT element and a vendor specific element, and wherein the TWT buffer size request is inserted into the vendor specific element.

6. The method of claim 1, wherein the request message comprises a TWT element, and wherein the TWT buffer size request is inserted into the TWT element.

7. The method of claim 1, wherein the TWT buffer size corresponds to an estimated amount of downlink data to be received at the responding station over a computer network while the requesting station is in the sleep mode.

8. The method of claim 7, wherein the estimated amount of downlink data corresponds to an application executing on the requesting station.

9. A system comprising:

a processing device; and a memory to store instructions that, when executed by the processing device cause the processing device to:

determine, on a requesting station, a target wake time (TWT) buffer size, wherein the TWT buffer size indicates a buffer size to allocate at a responding station when the requesting station is in a sleep mode;

insert, by the requesting station, a TWT buffer size request into a request message, wherein the TWT buffer size request comprises the TWT buffer size; and transmit the request message from the requesting station to the responding station.

10. The system of claim 9, wherein the processing device, responsive to executing the instructions, further causes the system to:

receive, at the requesting station, a response message from the responding station;

determine whether the response message comprises a TWT buffer size response;

in response to determining that the response message comprises the TWT buffer size response, negotiate, between the requesting station and the responding station, an acceptable TWT buffer size for the responding station to allocate when the requesting station is in the sleep mode.

11. The system of claim 10, wherein the request message comprises a TWT element, and wherein the processing device, responsive to executing the instructions, further causes the system to:

insert a TWT request into the TWT element, wherein the TWT request comprises a requested target wake time corresponding to an end of the sleep mode; and in response to determining that the response message does not comprise the TWT buffer size response, negotiate, between the requesting station and the responding station, an acceptable target wake time, based on the requested target wake time, for the requesting station to end the sleep mode.

12. The system of claim 10, wherein the response message comprises a vendor specific element, and wherein the vendor specific element comprises the TWT buffer size response.

13. The system of claim 9, wherein the request message comprises a TWT element and a vendor specific element, and wherein the TWT buffer size request is inserted into the vendor specific element.

14. The system of claim 9, wherein the request message comprises a TWT element, and wherein the TWT buffer size request is inserted into the TWT element.

15. The system of claim 9, wherein the TWT buffer size corresponds to an estimated amount of downlink data to be received at the responding station over a computer network while the requesting station is in the sleep mode.

16. A method comprising:

receiving a request message from a requesting station at a responding station;

determining, by a processing device executing on the responding station, whether the request message comprises a TWT buffer size request;

in response to determining that the request message comprises the TWT buffer size request, constructing a TWT buffer size response based on the TWT buffer size request; and transmitting a response message that comprises the TWT buffer size response to the requesting station.

17. The method of claim 16, further comprising:

in response to determining that the request message does not include the TWT buffer size request, constructing a TWT response based on a requested target wake time included in the request message; and transmitting the response message that comprises the TWT response to the requesting station.

18. The method of claim 16, further comprising:

allocating, by the responding station, a buffer size in a storage area to the requesting station based on the TWT buffer size request; and storing, by the responding station, downloaded data targeted to the requesting station while the requesting station is in a sleep mode.

19. The method of claim 16, wherein the request message comprises a vendor specific element, and wherein the vendor specific element comprises the TWT buffer size request.

20. The method of claim 16, wherein the request message comprises a TWT element, and wherein the TWT element comprises the TWT buffer size request.

\* \* \* \* \*